(12) United States Patent
Matsumoto

(10) Patent No.: US 10,723,565 B2
(45) Date of Patent: Jul. 28, 2020

(54) CONVEYANCE METHOD AND CONVEYANCE APPARATUS

(71) Applicant: HIRATA CORPORATION, Kumamoto-shi, Kumamoto (JP)

(72) Inventor: Bungo Matsumoto, Kumamoto (JP)

(73) Assignee: HIRATA CORPORATION, Kumamoto-Shi, Kumamoto-Ken (JP)

( * ) Notice: Subject to any disclaimer, the term of this patent is extended or adjusted under 35 U.S.C. 154(b) by 0 days.

(21) Appl. No.: 16/420,354

(22) Filed: May 23, 2019

(65) Prior Publication Data

US 2019/0276242 A1 Sep. 12, 2019

Related U.S. Application Data

(63) Continuation of application No. PCT/JP2017/028340, filed on Aug. 4, 2017.

(30) Foreign Application Priority Data

Nov. 25, 2016 (JP) .................. 2016-229134

(51) Int. Cl.
*B65G 43/02* (2006.01)
*B65G 17/12* (2006.01)
(Continued)

(52) U.S. Cl.
CPC ............ *B65G 43/02* (2013.01); *B65G 17/12* (2013.01); *B65G 23/26* (2013.01); *B65G 25/06* (2013.01);
(Continued)

(58) Field of Classification Search
CPC ...... B65G 25/04; B65G 25/06; B65G 35/066; B65G 43/02; B65G 17/12; B65G 23/26;
(Continued)

(56) References Cited

U.S. PATENT DOCUMENTS 3,268,055 A * 8/1966 Stein ....................... F26B 15/22
198/457.03
4,385,701 A * 5/1983 Buckminster ............. B07C 5/36
198/801
(Continued)

FOREIGN PATENT DOCUMENTS

CN 103958919 A 7/2014
CN 105059825 A 11/2015
(Continued)

OTHER PUBLICATIONS

International Preliminary Report on Patentability (Form PCT/IPEA/409) dated Mar. 5, 2019, in corresponding International Application No. PCT/JP2017/028340.
(Continued)

*Primary Examiner* — Mark A Deuble
(74) *Attorney, Agent, or Firm* — Buchanan Ingersoll & Rooney PC

(57) ABSTRACT

A conveyance method of conveying a conveyance target object by loading the conveyance target object on a slider, wherein the slider is connected to a ball nut threadably engaged with a ball screw shaft, includes a step of rotating the ball screw shaft by an electric motor, a step of applying a braking force which is a rotation resistance to the ball screw shaft by a non-electric resistance changing unit, and a step of setting at least one of a driving force of the electric motor and the braking force of the resistance changing unit so that the slider will stop when a predetermined external force acts on the slider during conveyance and changes the slider to an overload state regardless of the presence/absence of the conveyance target object loaded on the slider and a weight of the conveyance target object.

21 Claims, 8 Drawing Sheets

(51) Int. Cl.

| | | |
|---|---|---|
| *B65G 23/26* | (2006.01) | |
| *B65G 25/06* | (2006.01) | |
| *F16D 63/00* | (2006.01) | |
| *F16H 19/06* | (2006.01) | |
| *F16H 25/22* | (2006.01) | |
| *F16H 25/24* | (2006.01) | |
| *B65G 35/06* | (2006.01) | |
| *F16D 121/20* | (2012.01) | |
| *F16H 25/20* | (2006.01) | |

(52) U.S. Cl.
CPC ......... *B65G 35/066* (2013.01); *F16D 63/002* (2013.01); *F16H 19/06* (2013.01); *F16H 25/22* (2013.01); *F16H 25/2204* (2013.01); *F16H 25/2454* (2013.01); *F16D 2121/20* (2013.01); *F16H 2019/0686* (2013.01); *F16H 2025/2071* (2013.01)

(58) Field of Classification Search
CPC ..... B65G 43/04; B65G 43/06; F16H 25/2204; F16H 25/2454; F16H 19/06; F16H 2025/2071; F16D 63/002
USPC ........................................................ 198/801
See application file for complete search history.

(56) References Cited

U.S. PATENT DOCUMENTS

| | | | |
|---|---|---|---|
| 4,802,558 A | 2/1989 | Garnett | |
| 5,141,128 A * | 8/1992 | Pippin | B65G 17/16 |
| | | | 198/801 |
| 9,228,648 B2 | 1/2016 | Yamasaki et al. | |
| 9,624,994 B2 | 4/2017 | Yasui et al. | |
| 2001/0016087 A1 | 8/2001 | Akiyama et al. | |
| 2008/0271970 A1 | 11/2008 | Stoltze | |
| 2008/0289928 A1 | 11/2008 | Abraham et al. | |
| 2010/0000843 A1 * | 1/2010 | Nishikawa | B65G 33/04 |
| | | | 198/657 |
| 2013/0139622 A1 * | 6/2013 | Park | F16H 25/2454 |
| | | | 74/89.32 |
| 2017/0137228 A1 * | 5/2017 | Kyotani | B65G 21/22 |
| 2017/0219071 A1 * | 8/2017 | Gurdjian | F16H 25/2204 |
| 2019/0360565 A1 * | 11/2019 | Lee | F16H 25/2003 |

FOREIGN PATENT DOCUMENTS

| | | |
|---|---|---|
| CN | 105190080 A | 12/2015 |
| EP | 2 942 547 A2 | 11/2015 |
| JP | H02309046 A | 12/1990 |
| JP | H07131970 A | 5/1995 |
| JP | H07206088 A | 8/1995 |
| JP | 2000186477 A | 7/2000 |
| JP | 2001227537 A | 8/2001 |
| JP | 2002266972 A | 9/2002 |
| JP | 2002316791 A | 10/2002 |
| JP | 2006327733 A | 12/2006 |
| JP | 2010042911 A | 2/2010 |
| JP | 2015067405 A | 4/2015 |
| WO | 01/94244 A1 | 12/2001 |

OTHER PUBLICATIONS

International Search Report (PCT/ISA/210) dated Nov. 7, 2017, by the Japan Patent Office as the International Searching Authority for International Application No. PCT/JP2017/028340.

Written Opinion (PCT/ISA/237) dated Nov. 7, 2017, by the Japan Patent Office as the International Searching Authority for International Application No. PCT/JP2017/028340.

Written Opinion of IPEA (Corrected version) dated Nov. 6, 2018, by the Japan Patent Office as the International Searching Authority for International Application No. PCT/JP2017/028340.

Extended European Search Report dated Nov. 11, 2019, issued by the European Patent Office in corresponding European Application No. 17874519.6. (12 pages).

Chinese Office Action dated May 6, 2020 issued in corresponding Chinese Patent Application No. 201780072392.4, with Engilsh translation (24 pages).

* cited by examiner

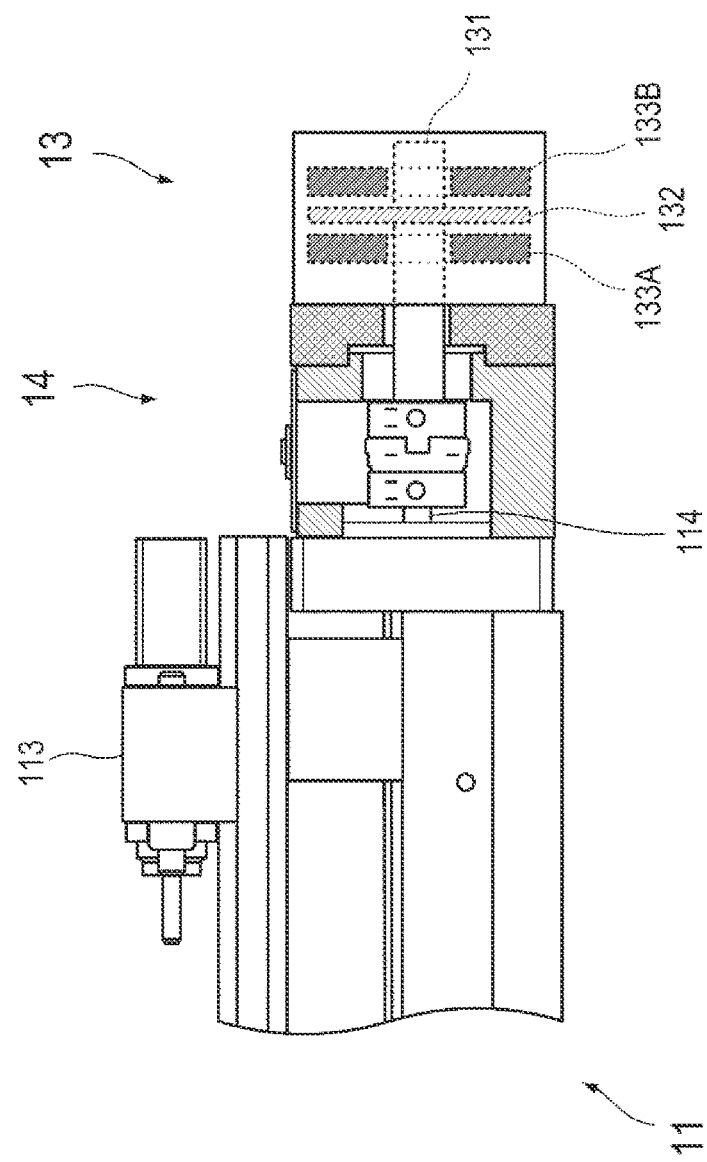

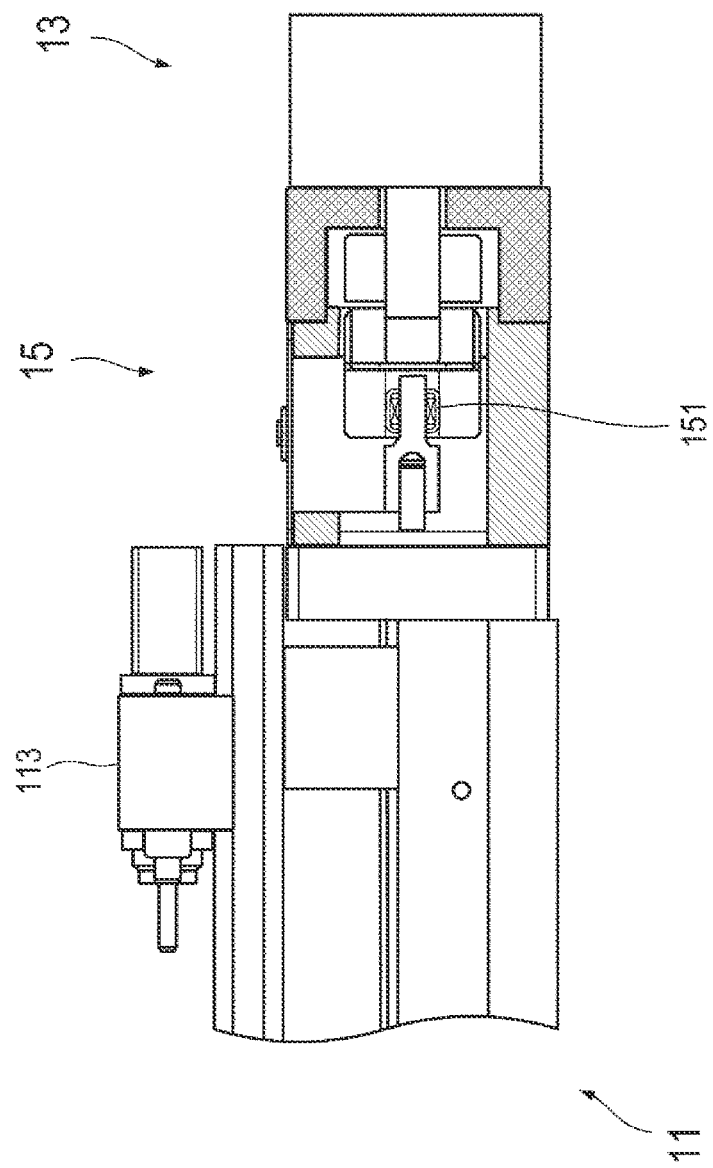

CONVEYANCE METHOD AND CONVEYANCE APPARATUS

CROSS-REFERENCE TO RELATED APPLICATIONS

This application is a continuation of International Patent Application No. PCT/JP2017/028340 filed on Aug. 4, 2017, which claims priority to and the benefit of Japanese Patent Application No. 2016-229134 filed on Nov. 25, 2016, the entire disclosures of which are incorporated herein by reference.

TECHNICAL FIELD

The present invention relates to a conveyance method and a conveyance apparatus.

BACKGROUND ART

A high-output motor is often used in a conveyance apparatus that conveys a target object by a slider scheme or a conveyor scheme (see PTL 1 and PTL 2). Hence, in a production facility, safety measures for workers are generally required. As a method of implementing the safety measures, installation of a fence restricting the entry of a worker or installation of a sensor (a light curtain or the like) that detects the entry of a worker and stops the motor can be considered.

CITATION LIST

Patent Literature

PTL 1: Japanese Patent Laid-Open No. 2006-327733
PTL 2: Japanese Patent Laid-Open No. 2015-67405

SUMMARY OF INVENTION

Technical Problem

However, many conveyance apparatuses are used in a production facility, and the above-described safety measures for each of these apparatuses can increase the facility cost. In addition, for example, if the motor is stopped in response to a sensor detecting the entry of a worker, it can degrade the productivity since the production line will be stopped over a broad area and require a considerable amount of time to return to the operating state.

Here, even in a case in which a conveyance apparatus using a high-output motor is used, it is possible to reduce the number of equipments used for safety measures if an apparatus that has a thrust low enough for the motor to stop automatically when a worker has casually come into contact with a moving component of the apparatus is used.

The object of the present invention is to implement a low-thrust conveyance apparatus that is capable of stopping, when a worker has come into contact with the conveyance apparatus during conveyance, only the conveyance apparatus without stopping other conveyance apparatuses and is capable of recovering quickly.

Solution to Problem

An aspect of the present invention relates to a conveyance method of conveying a conveyance target object by loading the conveyance target object on a slider, wherein the slider is connected to a ball nut threadably engaged with a ball screw shaft, and the conveyance method comprises a step of rotating the ball screw shaft by an electric motor, a step of applying a braking force which is a rotation resistance to the ball screw shaft by a non-electric resistance changing unit, a step of setting at least one of a driving force of the electric motor and the braking force of the resistance changing unit so that the slider will stop when a predetermined external force acts on the slider during conveyance and changes the slider to an overload state regardless of the presence/absence of the conveyance target object loaded on the slider and a weight of the conveyance target object, and a step of unidirectionally controlling, by using a one-way rotation transmission mechanism, a transmission direction of a rotation force toward the ball screw shaft by the electric motor when the slider is to move in a vertical direction, wherein in the step of unidirectionally controlling, when the balls screw shaft is rotated so as to move the slider in an upward direction, the one-way rotation transmission mechanism cuts off transmission of the rotation force of the electric motor and the braking force of the resistance changing unit, and when the ball screw shaft is rotated so as to move the slider in a downward direction, the one-way rotation transmission mechanism allows the transmission of the rotation force of the electric motor and the braking force of the resistance changing unit.

Another aspect of the present invention relates to a conveyance method of conveying a conveyance target object by loading the conveyance target object on a slider, wherein the slider is connected to a ball nut threadably engaged with a ball screw shaft, and the conveyance method comprises a step of rotating the ball screw shaft by an electric motor, a step of applying a braking force which is a rotation resistance to the ball screw shaft by a non-electric resistance changing unit, a step of setting at least one of a driving force of the electric motor and the braking force of the resistance changing unit so that the slider will stop when a predetermined external force acts on the slider during conveyance and changes the slider to an overload state regardless of the presence/absence of the conveyance target object loaded on the slider and a weight of the conveyance target object, and a step of unidirectionally controlling, by using a one-way rotation transmission mechanism, a transmission direction of a rotation force toward the ball screw shaft by the electric motor when the slider is to move in a vertical direction, wherein in the step of unidirectionally controlling, when the ball screw shaft is rotated to move the slider in an upward direction, the one-way rotation transmission mechanism cuts off transmission of the rotation force of the electric motor and the braking force of the resistance changing unit, and when the ball screw shaft is rotated to move the slider in a downward direction and a rotation torque which exceeds a predetermined torque acts on the one-way rotation transmission mechanism, the one-way rotation transmission mechanism allows the transmission of the rotation force of the electric motor and the braking force of the resistance changing unit.

Another aspect of the present invention relates to a conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises a step of rotating the driving shaft by the electric motor, a step of applying a braking force which is a rotation resistance to the driving shaft by a non-electric resistance changing unit, and a step of setting at least one of a driving force of the electric motor and the braking force of the resistance changing unit so that the moved member will stop when a predetermined external force acts on the moved member during conveyance and changes the moved member to an overload state regardless of the presence/absence of the conveyance target object loaded on the slider and a weight of the conveyance target object, and a step of unidirectionally controlling, by using a one-way rotation transmission mechanism, a transmission direction of a rotation force toward the driving shaft by the electric motor when the moved member is to move in a vertical direction, wherein in the step of unidirectionally controlling, when the rotated member is rotated so as to move the moved member in an upward direction, the one-way rotation transmission mechanism cuts off transmission of the rotation force of the electric motor and the braking force of the resistance changing unit, and when the rotated member is rotated so as to move the moved member in a downward direction, the one-way rotation transmission mechanism allows the transmission of the rotation force of the electric motor and the braking force of the resistance changing unit.

Another aspect of the present invention relates to a conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises a step of rotating the driving shaft by the electric motor, a step of applying a braking force which is a rotation resistance to the driving shaft by a non-electric resistance changing unit, and a step of setting at least one of a driving force of the electric motor and the braking force of the resistance changing unit so that the moved member will stop when a predetermined external force acts on the moved member during conveyance and changes the moved member to an overload state regardless of the presence/absence of the conveyance target object loaded on the slider and a weight of the conveyance target object, and a step of unidirectionally controlling, by using a one-way rotation transmission mechanism, a transmission direction of a rotation force toward the driving shaft by the electric motor when the moved member is to move in a vertical direction, wherein in the step of unidirectionally controlling, when the rotated member is rotated to move the moved member in an upward direction, the one-way rotation transmission mechanism cuts off transmission of the rotation force of the electric motor and the braking force of the resistance changing unit, and when the rotated member is rotated to move the moved member in a downward direction and a rotation torque which exceeds a predetermined torque acts on the one-way rotation transmission mechanism, the one-way rotation transmission mechanism allows the transmission of the rotation force of the electric motor and the braking force of the resistance changing unit.

Another aspect of the present invention relates to a conveyance method of conveying a conveyance target object by loading the conveyance target object on a slider, wherein the slider is connected to a ball nut threadably engaged with a ball screw shaft, and the conveyance method comprises a step of rotating the ball screw shaft by an electric motor, a step of applying a braking force which is a rotation resistance to the ball screw shaft by a non-electric resistance changing unit, and a step of adjusting, to stop the slider when an external force having an excessive load which exceeds a predetermined value acts on the slider during conveyance regardless of the presence/absence of the conveyance target object loaded on the slider and a weight of the conveyance target object, the braking force of the resistance changing unit, and setting a difference between a driving force of the electric motor and the predetermined external force to be not more than a sum of the weight of the conveyance target object, a weight of the slider, and the braking force of the resistance changing unit.

Another aspect of the present invention relates to a conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises a step of rotating the driving shaft by the electric motor, a step of applying a braking force which is a rotation resistance to the driving shaft by a non-electric resistance changing unit, and a step of adjusting, to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit, and setting a difference between a driving force of the electric motor and the external force to be not more than a sum of the weight of the conveyance target object, a weight of the moved member, and the braking force of the resistance changing unit.

Another aspect of the present invention relates a conveyance apparatus comprising an electric motor, a ball screw shaft to be connected to the electric motor, a ball nut to be threadably engaged with the ball screw shaft, a moved member to be connected to the ball nut, loaded with a conveyance target object, and moved in a vertical direction, a non-electric resistance changing unit to be connected to the ball screw shaft and configured to apply, to the ball screw shaft, a braking force which is a rotation resistance to the ball screw shaft and to be capable of adjusting the braking force, and a one-way rotation transmission mechanism configured to unidirectionally control a transmission direction of a rotation force toward the ball screw shaft by the electric motor, wherein when the ball screw shaft is to be rotated in one direction, the one-way rotation transmission mechanism runs idly to cut off transmission of the rotation force of the electric motor and the braking force of the resistance changing unit, and when the ball screw shaft is to be rotated in the other direction, the one-way rotation transmission mechanism is rotated to allow the transmission of the rotation force of the electric motor and the braking force of the resistance changing unit.

Another aspect of the present invention relates to a conveyance apparatus comprising an electric motor, a driving shaft to be connected to the electric motor, a rotated member to be rotated by the driving shaft, an endless traveling body to be engaged with the rotated member, a moved member to be connected to the endless traveling body, loaded with a conveyance target object, and move in a vertical direction, a non-electric resistance changing unit to be connected to the driving shaft and configured to apply, to the driving shaft, a braking force which is a rotation resistance to the ball screw and to be capable of adjusting the braking force, and a one-way rotation transmission mechanism configured to unidirectionally control a transmission direction of a rotation force toward the driving shaft by the electric motor, wherein when the rotated member is to be rotated in one direction, the one-way rotation transmission mechanism runs idly to cut off transmission of the rotation force of the electric motor and the braking force of the resistance changing unit, and when the rotated member is to be rotated in the other direction, the one-way rotation transmission mechanism is rotated to allow the transmission of the rotation force of the electric motor and the braking force of the resistance changing unit.

Yet another aspect of the present invention relates a conveyance apparatus comprising an electric motor, a ball screw shaft to be connected to the electric motor, a ball nut to be threadably engaged with the ball screw shaft, a moved member to be connected to the ball nut and loaded with a conveyance target object, and a non-electric resistance changing unit to be connected to the ball screw shaft and configured to apply, to the ball screw shaft, a braking force which is a rotation resistance to the ball screw shaft and to be capable of adjusting the braking force, wherein to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit is adjusted so a difference between a driving force of the electric motor and the external force will not be more than a sum of the weight of the conveyance target object, a weight of the moved member, and the braking force of the resistance changing unit.

Another aspect of the present invention relates to a conveyance apparatus comprising an electric motor, a driving shaft to be connected to the electric motor, a rotated member to be rotated by the driving shaft, an endless traveling body to be engaged with the rotated member, a moved member to be connected to the endless traveling body and loaded with a conveyance target object, and a non-electric resistance changing unit to be connected to the driving shaft and configured to apply a braking force, to the driving shaft, which is a rotation resistance to the ball screw shaft and to be capable of adjusting the braking force, wherein to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit is adjusted so a difference between a driving force of the electric motor and the external force will not be more than a sum of the weight of the conveyance target object, a weight of the moved member, and the braking force of the resistance changing unit.

Advantageous Effects of Invention

According to the present invention, it is possible to implement a low-thrust conveyance apparatus that, when a worker has come into contact with a given conveyance apparatus during conveyance, can stop only the conveyance apparatus without stopping other conveyance apparatuses and recover quickly.

BRIEF DESCRIPTION OF DRAWINGS

FIG. 2 is a view for explaining an example of the arrangement of a non-electric resistance changing unit;

FIG. 4 is for explaining an example of the arrangement of a unidirectional rotation voltage mechanism;

DESCRIPTION OF EMBODIMENTS

Figure 1:
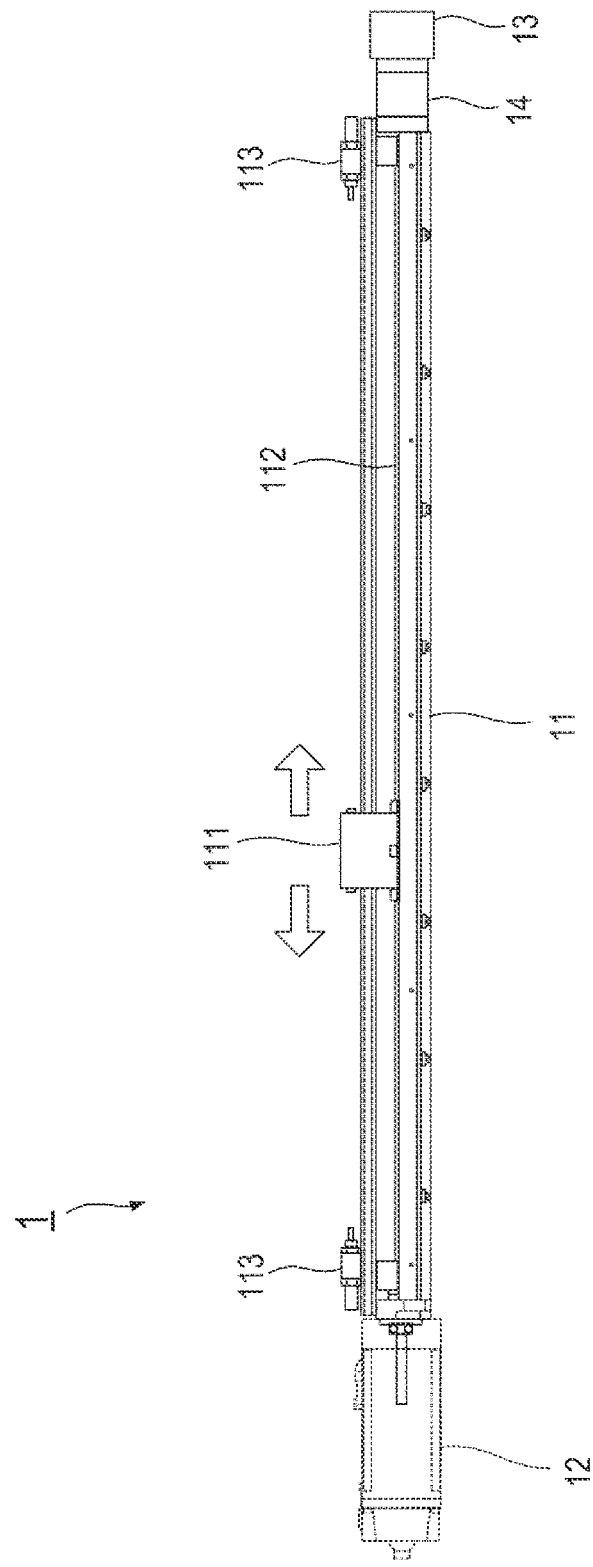
FIG. 1 is a view for explaining an example of the arrangement of a slider-scheme conveyance apparatus.

Embodiments of the present invention will now be described with reference to the accompanying drawings. Note that the drawings are schematic views showing structures or arrangements according to the embodiments, and the dimensions of members shown in the drawings do not necessarily reflect the actual members.

First Embodiment

FIG. 1 shows the arrangement of a slider-scheme conveyance apparatus 1 according to the first embodiment. The conveyance apparatus 1 includes a slider mechanism 11, an electric motor 12, a non-electric resistance changing unit 13, and a connection mechanism 14. The slider mechanism 11 includes a slider 111, a rail 112, and stoppers 113. The slider 111 is a member to be moved which has been formed to be reciprocally movable in the arrow directions of FIG. 1, and reciprocally moves along the rail 112 based on the driving operation performed by the electric motor 12. The stoppers 113 are arranged at the ends of the slider mechanism 11, and each stopper is formed to stop the slider 111 when it reaches the end. The electric motor 12 is arranged at one end of the slider mechanism 11, and the resistance changing unit 13 is arranged on the other end of the slider mechanism 11 via the connection mechanism 14.

FIG. 2 shows the arrangement of the resistance changing unit 13 together with the arrangement of the connection mechanism 14. The resistance changing unit 13 includes a shaft body 131, a collar-like disk body 132, a pair of magnetic bodies 133A and 133B. The collar-like disk body 132 is fixed to the shaft body 131. The pair of magnetic bodies 133A and 133B are arranged at the respective sides of the collar-like disk body 132, that is, the collar-like disk body 132 is positioned between the pair of magnetic bodies 133A and 133B.

The pair of magnetic bodies 133A and 133B are formed so that the relative positions of the magnetic poles can be changed in the circumferential direction. More specifically, it is arranged so that one of the magnetic bodies 133A and 133B can rotate with respect to the other, and the relative positions between the south and north poles of the magnetic body 133A and the south and north poles of the magnetic body 133B can be changed. The magnitude of the lines of magnetic force acting on the disk body 132 between the magnetic bodies 133A and 133B is changed by the change in these relative positions, and the rotation torque of the disk body 132 is adjusted to an arbitrary value in a predetermined range. This kind of arrangement allows the resistance changing unit 13 to apply a resistance (braking force) of an arbitrary value to the shaft body 131 and its connection-target rotation body (a ball screw shaft 114).

Although this embodiment will use, for example, PERMA-TORK (trademark: Koshin Seikosho, Ltd.) as the resistance changing unit 13, another non-contact torque control device not requiring a controller or electricity may be used as another example.

The connection mechanism 14 is a coupling mechanism that connects the shaft body 131 of the resistance changing unit 13 to the ball screw shaft 114 (to be described later) included in the slider mechanism 11 and integrally rotates the shaft body 131 and the ball screw shaft 114. A mechanism that corresponds to the diameter of both the shaft body 131 and the ball screw shaft 114 is used as the connection mechanism 14. In this embodiment, the shaft body 131 is coaxially connected and fixed to the ball screw shaft 114 by this arrangement.

The action of each component of the conveyance apparatus 1 when an object is conveyed in a horizontal direction will be described with reference to FIGS. 3A to 3D. In this embodiment, assume that the horizontal direction is a direction substantially parallel to the ground surface. Note that the connection mechanism 14 described above is not shown in FIGS. 3A to 3D since its relevance is low in the following description.

Figure 3A:
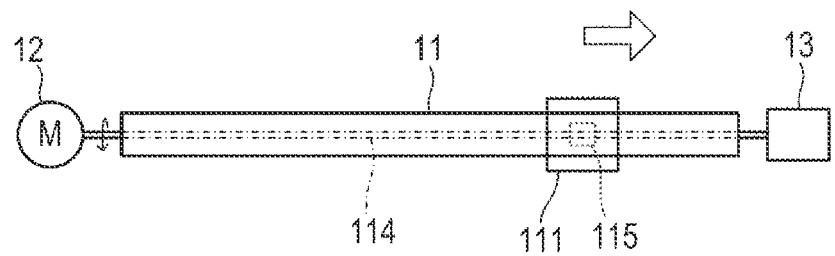
FIG. 3A is a view for explaining the action of each component of the conveyance apparatus when the object is conveyed in the horizontal direction.
Figure 3B:
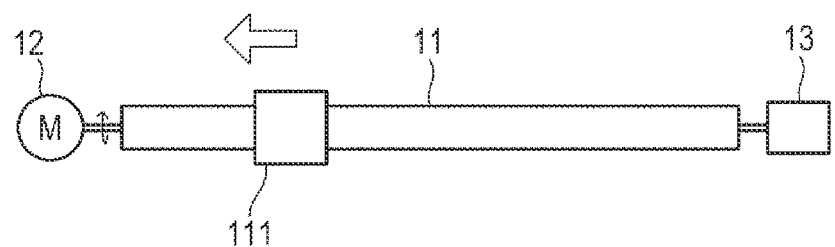
FIG. 3B is a view for explaining the action of each component of the conveyance apparatus when the object is conveyed in the horizontal direction.
Figure 3C:
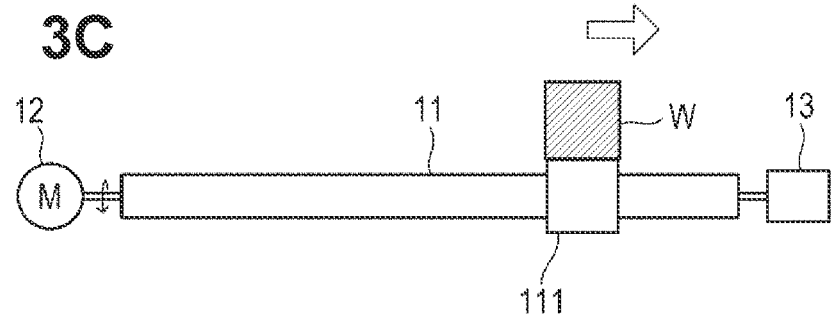
FIG. 3C is a view for explaining the action of each component of the conveyance apparatus when the object is conveyed in the horizontal direction.
Figure 3D:
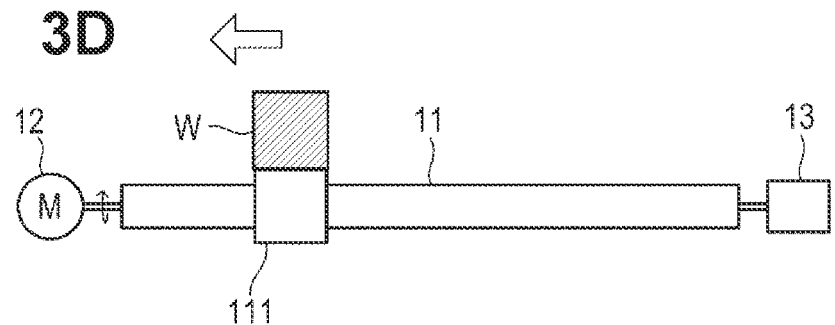
FIG. 3D is a view for explaining the action of each component of the conveyance apparatus when the object is conveyed in the horizontal direction.

FIG. 3A shows the mode of a case in which the slider 111, in an empty-load state, moves in the right direction (to the side of the resistance changing unit 13). FIG. 3B shows the mode of a case in which the slider 111, in the empty-load state, moves in the left direction (to the side of the electric motor 12). FIG. 3C shows the mode of a case in which the slider 111, in an object loaded state, moves in the right direction. FIG. 3D shows the mode of a case in which the slider 111, in the object loaded state, moves in the left direction. Assume here that the empty-load state indicates a state in which a work (conveyance target object) W is not loaded on the slider 111, and the object loaded state indicates a state in which the work W is loaded on the slider 111.

The case of FIG. 3A will be described first. The ball screw shaft 114 of the slider mechanism 11 is indicated by an alternate long and short dashed line in FIG. 3A for the sake of descriptive convenience. The ball screw shaft 114 is connected to the electric motor 12. The slider mechanism 11 further includes a ball nut 115 which is threadably engaged with the ball screw shaft 114, and the slider 111 is connected to the ball nut 115. When the electric motor 12 rotates the ball screw shaft 114 in one direction, the ball nut 115 and the slider 111 are moved together in the right direction in accordance with this rotation.

The shaft body 131 of the resistance changing unit 13 is connected to the ball screw shaft 114 via the connection mechanism 14 (not shown) in this embodiment. As a result, the resistance changing unit 13 can apply a braking force, which is a rotation resistance, to the ball screw shaft 114. The resistance changing unit 13 is formed to be capable of adjusting this braking force, and this braking force can be adjusted, in this embodiment, by changing the relative positions of the magnetic poles of the magnetic bodies 133A and 133B in the circumferential direction (see FIG. 2).

Here, let
FM be a driving torque of the electric motor 12,
WS be a weight of the slider 111, and
FR be a braking force of the resistance changing unit 13.
In this case, when $$FM > WS + FR$$

is established, the slider 111 will move in the right direction. Subsequently, the slider 111 will change to the overload state when a predetermined external force that hinders this movement acts on the slider, thereby stopping the movement of the slider 111. More specifically, letting
F0 be an external force,
the movement of the slider 111 stops when $$FM - F0 \leq WS + FR$$

is established.

Hence, it suffices to set at least one of FM (driving torque of the electric motor 12) and FR (the braking force of the resistance changing unit 13) so that the external force F0 (=FM−WS−FR) will fall within a predetermined reference range. This reference range is, determined to be, for example, a range (to be referred to as a "safety reference range" hereinafter) which will be sufficiently safe for a worker in the vicinity of the conveyance apparatus 1 and not stop the movement of the slider 111 by an unintended external force (sufficiently small external force). For example, at least one of FM and FR can be set so that F0 will fall within a range of 50 [N] or more and 150 [N] or less. For example, by setting $$FM = 120\ [N],$$

$$WS = 10\ [N],\text{ and}$$

$$FR = 30\ [N],$$

F0=80 [N] is established, and thus the external force falls within the safety reference range.

In this embodiment, FM is set as a fixed value, and only FR is set as a variable value. As described above, FR is variably adjusted by changing the relative positions of the magnetic poles of the magnetic bodies 133A and 133B in the circumferential direction. As a result, the rotational torque of the disk body 132 is adjusted to an arbitrary value in a predetermined range, and a braking force of the arbitrary value is applied to the ball screw shaft 114 via the shaft body 131 fixed to the disk body 132.

In the case of FIG. 3B, the electric motor 12 rotates the ball screw shaft 114 in a direction opposite to the case of FIG. 3A, thus moving the slider 111, in accordance with this rotation, together with the ball nut 115 in the left direction. In an arrangement in which the slider 111 moves in a horizontal direction, there is no difference between the load balance of the case of FIG. 3B in which the slider 111 moves in the left direction and that of the case of FIG. 3A in which the slider moves in the right direction. Hence, in also the case of FIG. 3B, the external force F0 will fall within the safety reference range in the same manner as in the case of FIG. 3A.

In the case of FIG. 3C, the work W is loaded onto the slider 111. Here, letting

WW be a weight of the work W,
when $$FM > WW + WS + FR$$

is established, the slider 111 will move in the right direction. Subsequently, the movement of the slider 111 stops when the external force F0 acts on the slider 111 and $$FM - F0 \leq WW + WS + FR$$

is established. Here, by setting $$WW = 30 \ [N],$$

F0=50 [N] is established, and thus the external force falls within the safety reference range.

The case of FIG. 3D is the same as the case of FIG. 3C. That is, in an arrangement in which the slider 111 in a horizontal direction, there is no difference between the load balance of the case of FIG. 3D in which the slider 111 moves in the left direction and that of the case of FIG. 3C in which the slider moves in the right direction. Hence, in also the case of FIG. 3D, the external force F0 will fall within the safety reference range in the same manner as in the case of FIG. 3C.

According to this embodiment, the slider 111 will change to the overload state and stop moving when the external force F0 acts on the slider 111 as described with reference to the cases shown in FIGS. 3A to 3D. At this time, at least one of the driving torque FM of the electric motor 12 and the braking force FR of the resistance changing unit 13 is set in consideration of the weight WS of the slider 111 and the weight of the work WW of the work W so that the external force F0 will fall within the safety reference range. According to this embodiment, since the slider 111 is stopped by the external force F0 which falls within the safety reference range regardless of the weight of the work WW of the work W or the presence/absence of the work W loaded on the slider 111, it is possible to implement a low-thrust conveyance apparatus which will be safe when a worker comes into contact with the apparatus. In addition, even in a case in which the movement of the slider 111 stops due to an unintentional contact with a worker or the like, the slider 111 will automatically start moving again after a predetermined time has elapsed. Hence, a robot control operator need not be present to make the conveyance apparatus operate again. Furthermore, a controller such as a teach pendant need not be used since the adjustment of the braking force FR of the resistance changing unit 13 requires only physical dial-adjustment (analog adjustment). Therefore, the robot control operator need not be present for the adjustment of the braking force FR, and the worker or the like can make the adjustment when necessary at an arbitrary timing.

Note that although the explanation of this embodiment has focused on worker safety, this is also similarly applicable to the safety of a person indirectly related to the work of the worker such as an assistant to the worker, a foreman, or the like as well as the safety of other persons in the vicinity of the conveyance apparatus 1 such as visitors and the like. This is also similarly applicable to other embodiments.

In addition, although FM is set as a fixed value and only FR is set as a variable value in this embodiment, both FM and FR may be set as variable values as another example.

For example, in a case in which the conveyance target object is changed from the work W to another work (to be referred to as W'), FR and FM are newly set based on the weight of this work W' so that the movement of the slider 111 will be stopped by the external force F0 which falls within the safety reference range.

Second Embodiment

Although the first embodiment above described cases in which the movement direction of the slider 111 was in a horizontal direction, the second embodiment will describe cases in which the movement direction of a slider 111 is in a vertical direction (perpendicular direction).

As shown in FIG. 4, in this embodiment, a conveyance mechanism 1 includes a one-way rotation transmission mechanism 15 instead of a connection mechanism 14. The one-way rotation transmission mechanism 15 connects, in the same manner as the connection mechanism 14, a ball screw shaft 114 of a slider mechanism 11 and a shaft body 131 of a resistance changing unit 13. On the other hand, the one-way rotation transmission mechanism 15 has a function different from that of the connection mechanism 14 in the point that it can rotate the ball screw shaft 114 and the shaft body 131 integrally in only one direction. That is, the ball screw shaft 114 and the shaft body 131 are not rotated integrally in a rotation in another direction, and a so-called idle running state occurs in the one-way rotation transmission mechanism 15.

The one-way rotation transmission mechanism 15 includes a known one-way clutch 151. By having this kind of arrangement, the one-way rotation transmission mechanism 15 transmits, to the shaft body 131, the rotation of the ball screw shaft 114 in one direction, and does not transmit, to the shaft body 131, the rotation of the ball screw shaft 114 in the other direction.

In this specification, assume hereinafter that a rotation direction in which the rotation of the ball screw shaft 114 is transmitted to the shaft body 131 is referred to as the "positive direction" and a rotation direction opposite to this direction will be referred to as the "negative direction". In addition, the state of the one-way rotation transmission mechanism 15 when it rotates in the positive direction will be referred to as an "operating state", and the state of the one-way rotation transmission mechanism 15 when it rotates in the negative direction will be referred to as an "idle running state".

Note that, for the sake of clarity, assume that resistance toward the rotation in the positive direction is not generated in the one-way rotation transmission mechanism 15 in the operation state, that is, assume that the one-way clutch 151 does not include a so-called torque limiter. A mode using this torque limiter will be described later.

Figure 5A:
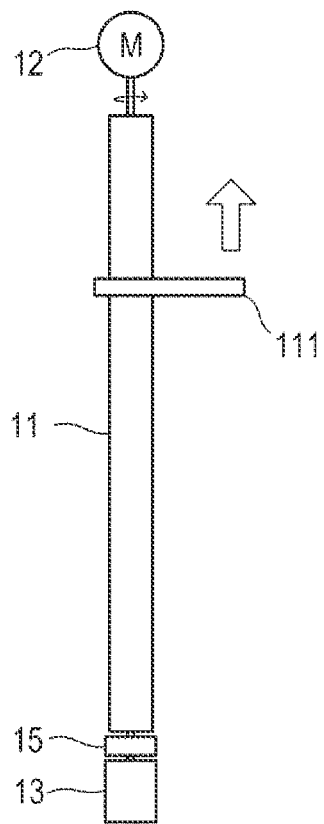
FIG. 5A is a view for explaining an example of the action of each component of the conveyance apparatus when an object is conveyed in a vertical direction.
Figure 5B:
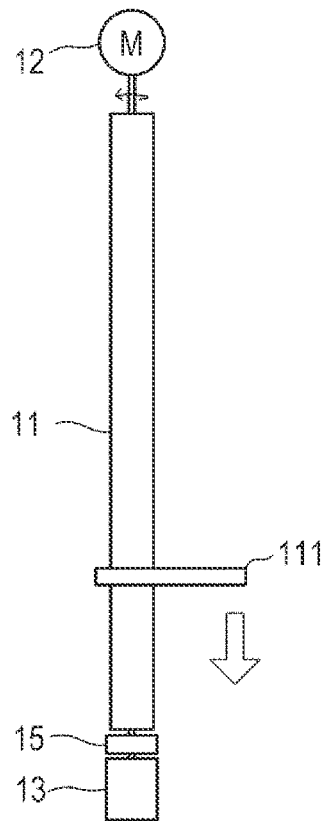
FIG. 5B is a view for explaining an example of the action of each component of the conveyance apparatus when the object is conveyed in the vertical direction.
Figure 5C:
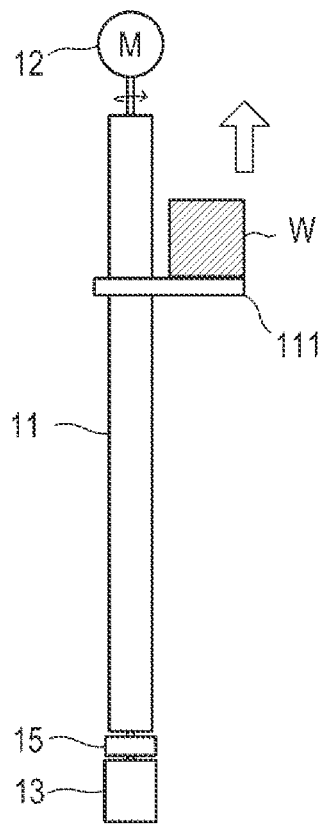
FIG. 5C is a view for explaining an example of the action of each component of the conveyance apparatus when the object is conveyed in the vertical direction.
Figure 5D:
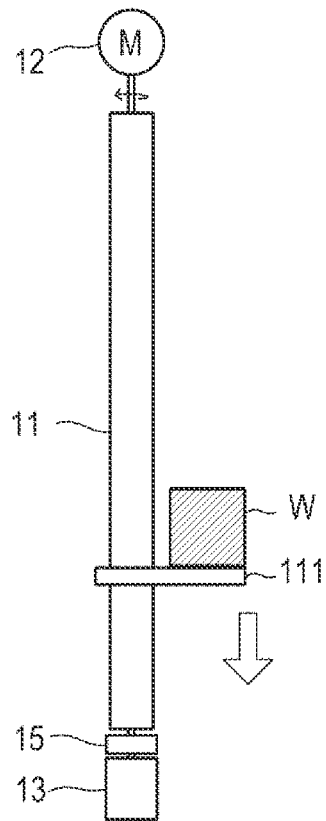
FIG. 5D is a view for explaining an example of the action of each component of the conveyance apparatus when the object is conveyed in the vertical direction.

The action of each component of the conveyance apparatus 1 when conveying an object in a vertical direction will be described next with reference to FIGS. 5A to 5D. FIG. 5A shows the mode of a case in which the slider 111, in an empty-load state, moves in the upward direction (to the side of an electric motor 12). FIG. 5B shows the mode of a case in which the slider 111, in the empty-load state, moves in the downward direction (to the side of the resistance changing unit 13). FIG. 5C shows the mode of a case in which the slider 111, in an object loaded state, moves in the upward direction. FIG. 5D shows the mode of a case in which the slider 111, in the object loaded state, moves in the downward direction. In this case, the one-way rotation transmission mechanism 15 is installed to be set to the idle running state when (cases shown in FIGS. 5A and 5C) the slider 111 is to be moved in the upward direction, and to the operating state when (cases shown in FIGS. 5B and 5D) the slider 111 is to be moved in the downward direction.

In the case of FIG. 5A, the slider 111 moves in the upward direction, that is, the slider 111 is raised against gravity. Hence, it is preferable not to apply the braking force by the resistance changing unit 13. In the case of FIG. 5A, the one-way rotation transmission mechanism 15 between the slider mechanism 11 and the resistance changing unit 13 is set to the idle running state. As a result, since the rotation of the ball screw shaft 114 of the slider mechanism 11 is not transmitted to the shaft body 131 of the resistance changing unit 13, the braking force described above is not applied to the rotation of the ball screw shaft 114.

Here, if FM (a driving torque of the electric motor 12), WS (a weight of the slider 111), and FR (a braking force of the resistance changing unit 13) are used in the same manner as in the first embodiment, the slider 111 moves in the upward direction (that is, FR does not appear in this inequality) when $$FM > WS$$

is established. Subsequently, when an external force F0 hindering this movement acts on the slider and $$FM - F0 \leq WS$$

is established, the slider 111 changes to the overload state, and the movement of the slider 111 stops. Here, in the same manner as the first embodiment, by setting $$FM = 120 \, [N],$$

$$WS = 10 \, [N], \text{ and}$$

$$FR = 30 \, [N],$$

F0 (=FM−WS)=110 [N] is established, and thus the external force falls within the safety reference range (that is, the range of 50 [N] or more and 150 [N] or less) described above.

In the case of FIG. 5B, the slider 111 moves in the downward direction, in other words, the electric motor 12 assists the free fall of slider 111 due to gravity.

Hence, in the case of FIG. 5B, it is preferable to apply the braking force FR by the resistance changing unit 13. The one-way rotation transmission mechanism 15 between the slider mechanism 11 and the resistance changing unit 13 is set to the operating state in the case of FIG. 5B. As a result, the rotation of the ball screw shaft 114 of the slider mechanism 11 is transmitted to the shaft body 131 of the resistance changing unit 13, and the braking force FR is applied to the rotation of the ball screw shaft 114.

Hence, in the case of FIG. 5B, when $$FM + WS > FR$$

is established, the slider 111 moves in the downward direction. Subsequently, when the external force F0 hindering this movement acts on the slider and $$FM + WS - F0 \leq FR$$

is established, the movement of the slider 111 stops. Here, in the same manner as the first embodiment, by setting $$FM = 120 \, [N],$$

$$WS = 10 \, [N], \text{ and}$$

$$FR = 30 \, [N],$$

F0 (=FM+WS−FR)=100 [N] is established, and thus the external force falls within the safety reference range.

Comparing the cases of FIGS. 5A and 5B, compared to the case of FIG. 5A in which FR is not applied (equivalent to FR=0 [N]), FR is applied (FR=30 [N] in this example) in the case of FIG. 5B. That is, according to this embodiment, when the slider 111 is to ascend, FR which can act as a hindering influence is cut off, and the one-way rotation transmission mechanism 15 is operated so a brake will not be applied to the ascent. On the other hand, when the slider 111 is to descend, FR is made to act on the slider so as to suppress the descent, and the one-way rotation transmission mechanism 15 is operated so that a brake will be applied to the decent.

In the case of FIG. 5C, the slider 111 moves in the upward direction in a state in which a work W is loaded on the slider 111. Here, letting WW be a weight of the work W, the slider 111 moves in the upward direction (that is, FR does not appear in this inequality) when $$FM > WW + WS$$

is established. Subsequently, when the external force F0 hindering this movement acts on the slider, and $$FM - F0 \leq WW + WS$$

is established, the slider 111 will change to the overload state, and the movement of the slider 111 stops. Here, in the same manner as the first embodiment, by setting $$WW = 30 \, [N],$$

$$F0(=FM-WW-WS)=80 \, [N]$$

is established, and thus the external force falls within the safety reference range.

In the case of FIG. 5D, the slider 111 moves in the downward direction in a state in which the work W is loaded on the slider 111. In the case of FIG. 5B, when $$FM + WW + WS > FR$$

is established, the slider 111 moves in the downward direction. Subsequently, when the external force F0 hindering this movement acts on the slider and $$FM + WW + WS - F0 \leq FR$$

is established, the movement of the slider 111 stops. Hence, the external force F0 becomes F0 (=FM+WW+WS−FR)=130 [N] and thus falls within the safety reference range.

According to this embodiment, as described with reference to the cases shown in FIGS. 5A to 5D, even in cases in which the convey direction is the vertical direction, the slider 111 will stop by changing to the overload state when the external force F0 acts on the slider 111. Subsequently, at least one of the driving torque FM of the electric motor 12 and the braking force FR of the resistance changing unit 13 is set in consideration of the weight WS of the slider 111 and the weight of the work WW of the work W so that the external force F0 will fall within the safety reference range. Hence, according to this embodiment, it is also possible to implement a low-thrust conveyance apparatus which will be safe when a worker comes into contact with the apparatus.

Third Embodiment

The second embodiment described above assumed that the one-way clutch 151 does not include a torque limiter. However, the third embodiment hereinafter will describe the mode of a case in which a one-way clutch 151 includes a predetermined torque limiter with reference to FIGS. 5A to 5D. That is, in this embodiment, a resistance toward the rotation in the positive direction is generated in a one-way rotation transmission mechanism 15 in the operating state. In other words, a predetermined torque is required to rotate a ball screw shaft 114 in the positive direction, and the ball screw shaft 114 will not rotate in the positive direction without the application of a rotation torque equal to a reference value or more. Hence, the one-way rotation transmission mechanism 15 according to this embodiment acts as a resistor unit that applies a resistance (braking force) to this rotation when the ball screw shaft 114 is to be rotated in the positive direction. Note that the case of the idle running state (when the ball screw shaft 114 is rotated in the negative direction), the contents described in the above second embodiment remain intact without a change.

The cases of FIGS. 5A and 5C are the same as those in the second embodiment. That is, when a slider 111 is to move upward, the one-way rotation transmission mechanism 15 is in the idle running state. Hence, since the rotation of the ball screw shaft 114 is not transmitted to a shaft body 131, a braking force FR is not applied to the rotation of the ball screw shaft 114. Therefore, an external force F0 that stops the movement of the slider 111 will obtain the same result as the contents described in the second embodiments.

In the case of FIG. 5B, the slider 111 moves in the downward direction. As described in the second embodiment, in the case of FIG. 5B, by setting the one-way rotation transmission mechanism 15 to the operating state, the rotation of the ball screw shaft 114 is transmitted to the shaft body 131, and the braking force FR is applied to the ball screw shaft 114. In this embodiment, since the one-way clutch 151 further includes a torque limiter, a predetermined torque is generated in the one-way rotation transmission mechanism 15. This torque acts as the braking force that suppresses the descent of the slider 111.

Hence, in the case of FIG. 5B, letting
LM be a braking force by the torque limiter,
the slider 111 moves in the downward direction when $$FM+WS>FR+LM$$

is established. Subsequently, when the external force F0 hindering this movement acts on the slider and $$FM+WS-F0 \leq FR+LM$$

is established, the movement of the slider 111 will stop. Hence, by setting $$LM=50\ [N],$$

F0(=FM+WS−FR−LM)=50 [N] is established, and thus the external force F0 falls within the safety reference range (that is, 50 [N] or more and 150 [N] or less).

Comparing the cases of FIGS. 5A and 5B, compared to the case of FIG. 5A in which FR is not applied (equivalent to FR=0 [N]), LM is applied in addition to FR (LM+FR=80 [N] in this example) in the case of FIG. 5B. That is, according to this embodiment, while FR which acts as a hindrance is cut off when the slider 111 is to be raised, FR and LM act on the slider to suppress the descent when the slider 111 is to descend.

On the other hand, in the case of FIG. 5D, when $$FM+WW+WS>FR+LM$$

is established, the slider 111 moves in the downward direction. Subsequently, when the external force F0 hindering this movement acts on the slider and $$FM+WW+WS-F0 \leq FR+LM$$

is established, the movement of the slider 111 will stop. Hence, by setting $$WW=30\ [N],$$

F0(=FM+WW+WS−FR−LM)=80 [N] is established, and thus the external force falls within the safety reference range.

According to this embodiment, in addition to obtaining the effects of the second embodiment, it is possible to increase the braking force when the slider 111 is to descend and it is possible to implement more appropriately a low thrust that can stop the apparatus when a worker comes into contact with the apparatus. Thus, this embodiment is more advantageous than the second embodiment. For example, it may be set so the total of the driving torque of an electric motor 12 and the weight of the slider 111 will not exceed the torque limiter, while it may be set so that the total of the driving torque of the electric motor 12, the weight of the slider 111, and the weight of a work W will exceed the torque limiter. As a result, since the slider 111 will not descend by itself even if the electric motor 12 is driven because the torque limiter will act as a brake, it can be set so that the slider 111 will start to descend only when the work W has been loaded onto the slider 111.

Fourth Embodiment

Figure 6A:
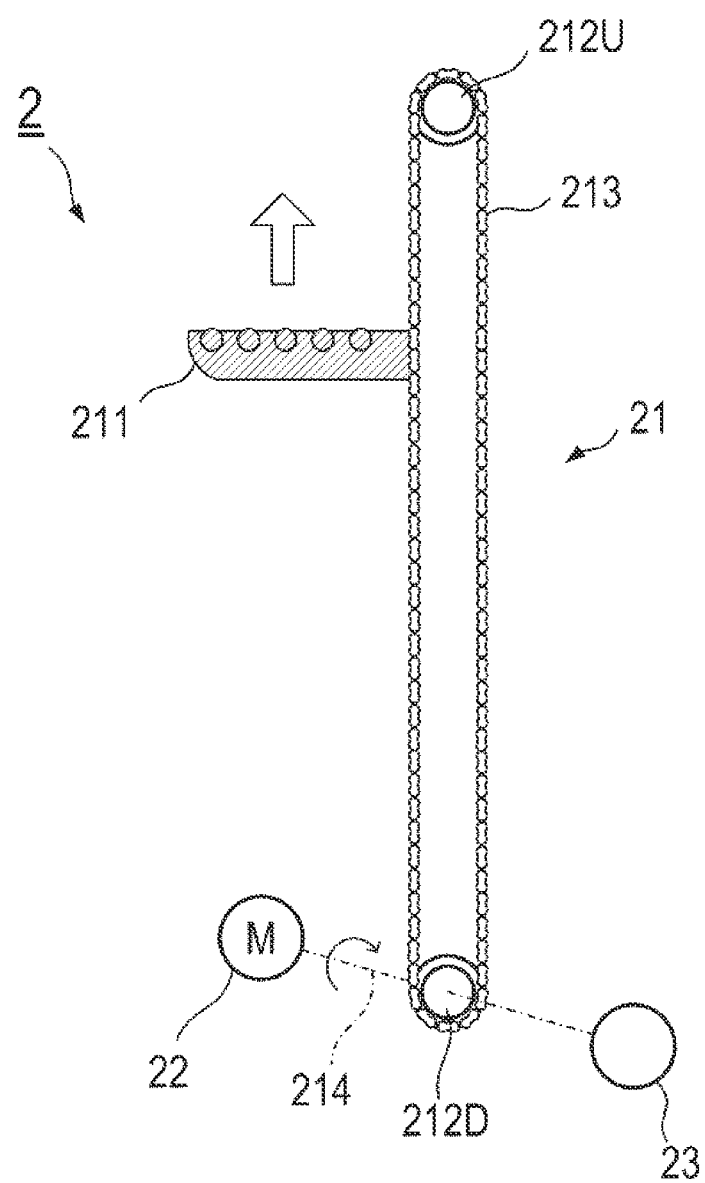
FIG. 6A is a view for explaining an example of the arrangement of a conveyor-scheme conveyance apparatus.
Figure 6B:
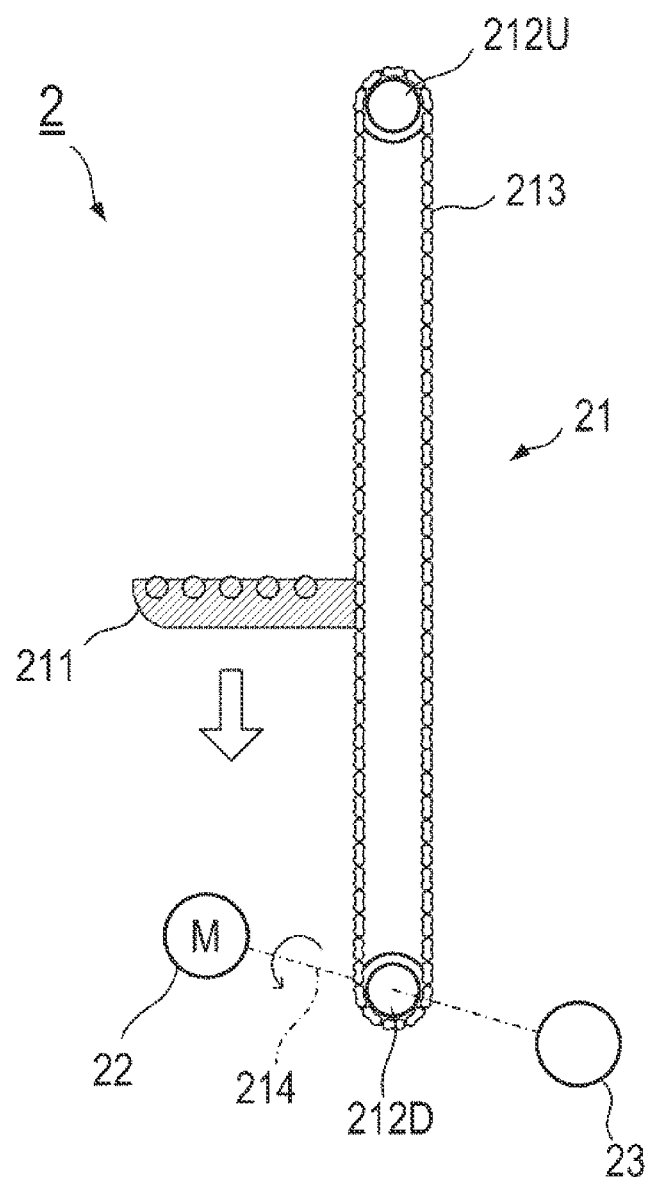
FIG. 6B is a view for explaining the arrangement of the conveyor-scheme conveyance apparatus.

Although a slider-scheme conveyance method has been exemplified in the first to third embodiments described above, the same method can be applied to a conveyor-scheme conveyance method. FIGS. 6A and 6B show the arrangement of a conveyor-method conveyance apparatus 2 according to the fourth embodiment. The conveyor-method conveyance apparatus 2 includes a conveyor mechanism 21, an electric motor 22, and a non-electric resistance changing unit 23. The functions of the conveyor mechanism 21, the electric motor 22, and the resistance changing unit 23 correspond to the functions of a slider mechanism 11, an electric motor 12, and a resistance changing unit 13.

The conveyor mechanism 21 includes a moved member 211, rotated members 212 (212U and 212D), and an endless traveling body 213. The moved member 211 is configured so that a work W can be placed on its upper surface. The moved member 211 is configured to be reciprocally movable in the directions of the arrows shown in FIGS. 6A and 6B based on the driving operation by the electric motor 22.

More specifically, the endless traveling body 213 is arranged like a loop in the vertical direction, and the rotated member 212U and the rotated member 212D are arranged in the inner-circumference side at the upper end and the inner-circumference side at downward end, respectively of the loop. The endless traveling body 213 is engaged to the rotated members 212U and 212D, and the endless traveling body 213 travels in the upward direction or in the downward direction in accordance with the rotation of the rotated members 212U and 212D. Although the endless traveling body 213 is made of a chain member in this embodiment, it may be made of a belt member. In addition, the moved member 211 is fixed to the endless traveling body 213. Since the rotated member 212D is rotated by a driving shaft 214 connected to the electric motor 22, and the endless traveling body 213 travels in the upward direction or the downward direction in accordance with the rotation of the rotated member 212D, the moved member 211 can move in the vertical direction.

In this embodiment, the rotated member 212D is connected around the driving shaft 214 of the electric motor 22, and the resistance changing unit 23 is connected to the driving shaft 214 via a coupling or the like. The electric motor 22 rotates the rotated member 212D and the resistance changing unit 23 applies a resistance (braking force) to the rotation of the driving shaft 214. The same effects as those of the slider scheme can also be obtained by this arrangement.

That is, when an external force (for example, F0) acts on the moved member 211, the moved member 211 changes to the overload state and stops moving. Subsequently, for example, at least one of a driving torque (for example, FM) of the electric motor 22 and a braking force (for example, FR) of the resistance changing unit 23 is set in consideration of a weight (for example, WS) of the moved member 211 and a weight (for example, WW) of the work W so that this external force will fall within the safety reference range described above. As a result, it is possible to implement a low-thrust conveyance apparatus which will be safe when a worker comes into contact with the apparatus.

In addition, a one-way rotation transmission mechanism (for example, a one-way rotation transmission mechanism 15 shown in FIG. 4) may be further set so that the braking force of the resistance changing unit 23 will be cut off when the moved member 211 is to move in the upward direction and the braking force will be applied when the moved member 211 is to move in the downward direction. In this case, the one-way rotation transmission mechanism will be arranged, for example, between the rotated member 212D and the resistance changing unit 23.

Note that in this embodiment, both the electric motor 22 and the resistance changing unit 23 were arranged on the side of the rotated member 212D. However, as another example, the electric motor 22 and the resistance changing unit 23 may be arranged on the side of the rotated member 212U. In addition, as yet another example, one of the electric motor 22 and the resistance changing unit 23 may be arranged on the side of the rotated member 212D and the other may be arranged on the side of the rotated member 212U. The same effects as those of the embodiment can be obtained also by these examples. Furthermore, although this embodiment described an example of an elevating apparatus in which the conveyor mechanism extends in the vertical direction, it goes without saying that a horizontal transfer apparatus in which the conveyor mechanism extends in the horizontal direction may also be used.

Other Embodiments

Several preferred embodiments have been described above. However, the present invention is not limited to these examples and may partially be modified without departing from the scope of the invention. For example, other elements may be combined with the contents of the embodiments in accordance with the object, application purpose, and the like, and the contents of a certain embodiment may be combined with part of the contents of another embodiment. In addition, individual terms described in this specification are merely used for the purpose of explaining the present invention, and the present invention is not limited to the strict meanings of the terms and can also incorporate their equivalents.

The present invention is not limited to the above-described embodiments, and various changes and modifications can be made within the spirit and scope of the present invention. Therefore, to apprise the public of the scope of the present invention, the following claims are made.

The invention claimed is:

1. A conveyance method of conveying a conveyance target object by loading the conveyance target object on a slider, wherein the slider is connected to a ball nut threadably engaged with a ball screw shaft, and the conveyance method comprises:
    a step of rotating the ball screw shaft by an electric motor;
    a step of applying a braking force which is a rotation resistance to the ball screw shaft by a non-electric resistance changing unit;
    a step of setting at least one of a driving force of the electric motor and the braking force of the resistance changing unit so that the slider will stop when a predetermined external force acts on the slider during conveyance and changes the slider to an overload state regardless of the presence/absence of the conveyance target object loaded on the slider and a weight of the conveyance target object; and
    a step of unidirectionally controlling, by using a one-way rotation transmission mechanism, a transmission direction of a rotation force toward the ball screw shaft by the electric motor when the slider is to move in a vertical direction,
    wherein in the step of unidirectionally controlling,
    when the balls screw shaft is rotated so as to move the slider in an upward direction, the one-way rotation transmission mechanism cuts off transmission of the rotation force of the electric motor and the braking force of the resistance changing unit, and
    when the ball screw shaft is rotated so as to move the slider in a downward direction, the one-way rotation transmission mechanism allows the transmission of the rotation force of the electric motor and the braking force of the resistance changing unit.

2. The conveyance method according to claim 1, wherein in the step of applying, the resistance changing unit which includes a collar-like disk body, which is fixed to a shaft body coaxially connected to one of the ball screw shaft and the driving shaft, and a pair of magnetic bodies arranged on both sides of the disk body is used to apply the braking force to one of the ball screw shaft and the driving shaft by changing the relative positions of magnetic poles in a circumferential direction of the pair of magnetic bodies to change the magnitude of line of magnetic forces acting on the disk body.

3. The conveyance method according to claim 1, wherein the external force falls within a range of not less than 50 [N] and not more than 150 [N].

4. A conveyance method of conveying a conveyance target object by loading the conveyance target object on a slider, wherein the slider is connected to a ball nut threadably engaged with a ball screw shaft, and the conveyance method comprises:
    a step of rotating the ball screw shaft by an electric motor;
    a step of applying a braking force which is a rotation resistance to the ball screw shaft by a non-electric resistance changing unit;
    a step of setting at least one of a driving force of the electric motor and the braking force of the resistance changing unit so that the slider will stop when a predetermined external force acts on the slider during conveyance and changes the slider to an overload state regardless of the presence/absence of the conveyance target object loaded on the slider and a weight of the conveyance target object; and a step of unidirectionally controlling, by using a one-way rotation transmission mechanism, a transmission direction of a rotation force toward the ball screw shaft by the electric motor when the slider is to move in a vertical direction, wherein in the step of unidirectionally controlling, when the ball screw shaft is rotated to move the slider in an upward direction, the one-way rotation transmission mechanism cuts off transmission of the rotation force of the electric motor and the braking force of the resistance changing unit, and when the ball screw shaft is rotated to move the slider in a downward direction and a rotation torque which exceeds a predetermined torque acts on the one-way rotation transmission mechanism, the one-way rotation transmission mechanism allows the transmission of the rotation force of the electric motor and the braking force of the resistance changing unit.

5. A conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises:

a step of rotating the driving shaft by the electric motor;

a step of applying a braking force which is a rotation resistance to the driving shaft by a non-electric resistance changing unit; and a step of setting at least one of a driving force of the electric motor and the braking force of the resistance changing unit so that the moved member will stop when a predetermined external force acts on the moved member during conveyance and changes the moved member to an overload state regardless of the presence/absence of the conveyance target object loaded on the slider and a weight of the conveyance target object; and a step of unidirectionally controlling, by using a one-way rotation transmission mechanism, a transmission direction of a rotation force toward the driving shaft by the electric motor when the moved member is to move in a vertical direction, wherein in the step of unidirectionally controlling, when the rotated member is rotated so as to move the moved member in an upward direction, the one-way rotation transmission mechanism cuts off transmission of the rotation force of the electric motor and the braking force of the resistance changing unit, and when the rotated member is rotated so as to move the moved member in a downward direction, the one-way rotation transmission mechanism allows the transmission of the rotation force of the electric motor and the braking force of the resistance changing unit.

6. A conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises:

a step of rotating the driving shaft by the electric motor;

a step of applying a braking force which is a rotation resistance to the driving shaft by a non-electric resistance changing unit; and a step of setting at least one of a driving force of the electric motor and the braking force of the resistance changing unit so that the moved member will stop when a predetermined external force acts on the moved member during conveyance and changes the moved member to an overload state regardless of the presence/absence of the conveyance target object loaded on the slider and a weight of the conveyance target object; and a step of unidirectionally controlling, by using a one-way rotation transmission mechanism, a transmission direction of a rotation force toward the driving shaft by the electric motor when the moved member is to move in a vertical direction, wherein in the step of unidirectionally controlling, when the rotated member is rotated to move the moved member in an upward direction, the one-way rotation transmission mechanism cuts off transmission of the rotation force of the electric motor and the braking force of the resistance changing unit, and when the rotated member is rotated to move the moved member in a downward direction and a rotation torque which exceeds a predetermined torque acts on the one-way rotation transmission mechanism, the one-way rotation transmission mechanism allows the transmission of the rotation force of the electric motor and the braking force of the resistance changing unit.

7. A conveyance method of conveying a conveyance target object by loading the conveyance target object on a slider, wherein the slider is connected to a ball nut threadably engaged with a ball screw shaft, and the conveyance method comprises:

a step of rotating the ball screw shaft by an electric motor;

a step of applying a braking force which is a rotation resistance to the ball screw shaft by a non-electric resistance changing unit; and a step of adjusting, to stop the slider when an external force having an excessive load which exceeds a predetermined value acts on the slider during conveyance regardless of the presence/absence of the conveyance target object loaded on the slider and a weight of the conveyance target object, the braking force of the resistance changing unit, and setting a difference between a driving force of the electric motor and the predetermined external force to be not more than a sum of the weight of the conveyance target object, a weight of the slider, and the braking force of the resistance changing unit.

8. The conveyance method according to claim 7, wherein in the step of setting, the driving force of the electric motor is further adjusted.

9. A conveyance method of conveying a conveyance target object by loading the conveyance target object on a moved member, wherein the moved member is connected to an endless traveling body to be engaged with a rotated member to be rotated by a driving shaft connected to an electric motor, and the conveyance method comprises:

a step of rotating the driving shaft by the electric motor;

a step of applying a braking force which is a rotation resistance to the driving shaft by a non-electric resistance changing unit; and a step of adjusting, to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit, and setting a difference between a driving force of the electric motor and the external force to be not more than a sum of the weight of the conveyance target object, a weight of the moved member, and the braking force of the resistance changing unit.

10. The conveyance method according to claim 9, wherein in the step of setting, the driving force of the electric motor is further adjusted.

11. The conveyance method according to claim 9, wherein in the step of setting, the driving force of the electric motor is fixed, and only the braking force of the resistance changing unit can be changed.

12. A conveyance apparatus comprising:
an electric motor;
a ball screw shaft to be connected to the electric motor;
a ball nut to be threadably engaged with the ball screw shaft;
a moved member to be connected to the ball nut, loaded with a conveyance target object, and moved in a vertical direction;
a non-electric resistance changing unit to be connected to the ball screw shaft and configured to apply, to the ball screw shaft, a braking force which is a rotation resistance to the ball screw shaft and to be capable of adjusting the braking force; and
a one-way rotation transmission mechanism configured to unidirectionally control a transmission direction of a rotation force toward the ball screw shaft by the electric motor,
wherein when the ball screw shaft is to be rotated in one direction, the one-way rotation transmission mechanism runs idly to cut off transmission of the rotation force of the electric motor and the braking force of the resistance changing unit, and
when the ball screw shaft is to be rotated in the other direction, the one-way rotation transmission mechanism is rotated to allow the transmission of the rotation force of the electric motor and the braking force of the resistance changing unit.

13. The conveyance apparatus according to claim 12, wherein when one of the ball screw shaft and the rotated member is rotated in the other direction and a rotation torque which exceeds a predetermined torque acts on the one-way rotation transmission mechanism, the one-way rotation transmission mechanism allows the transmission of the rotation force of the electric motor and the braking force of the resistance changing unit.

14. The conveyance apparatus according to claim 12, wherein the resistance changing unit is a non-contact torque control apparatus.

15. The conveyance apparatus according to claim 14, wherein the non-contact torque control apparatus includes
a collar-like disk body fixed to a shaft body coaxially connected to one of the ball screw shaft and the driving shaft and a pair of magnetic bodies arranged on both sides of the disk body, and
applies the braking force to one of the ball screw shaft and the driving shaft by changing relative positions of magnetic poles in a circumferential direction of the pair of magnetic bodies to change the magnitude of lines of magnetic forces acting on the disk body.

16. The conveyance apparatus according to claim 12, wherein one of the force of the electric motor and the braking force of the resistance changing unit is adjusted so as to stop the moved member when a predetermined external force acts on the moved member during the conveyance and the moved member changes to an overload state, and
the predetermined external force falls within a range of not less than 50 [N] and not more than 150 [N].

17. A conveyance apparatus comprising:
an electric motor;
a driving shaft to be connected to the electric motor;
a rotated member to be rotated by the driving shaft;
an endless traveling body to be engaged with the rotated member;
a moved member to be connected to the endless traveling body, loaded with a conveyance target object, and move in a vertical direction;
a non-electric resistance changing unit to be connected to the driving shaft and configured to apply, to the driving shaft, a braking force which is a rotation resistance to the ball screw and to be capable of adjusting the braking force; and
a one-way rotation transmission mechanism configured to unidirectionally control a transmission direction of a rotation force toward the driving shaft by the electric motor,
wherein when the rotated member is to be rotated in one direction, the one-way rotation transmission mechanism runs idly to cut off transmission of the rotation force of the electric motor and the braking force of the resistance changing unit, and
when the rotated member is to be rotated in the other direction, the one-way rotation transmission mechanism is rotated to allow the transmission of the rotation force of the electric motor and the braking force of the resistance changing unit.

18. A conveyance apparatus comprising:
an electric motor;
a ball screw shaft to be connected to the electric motor;
a ball nut to be threadably engaged with the ball screw shaft;
a moved member to be connected to the ball nut and loaded with a conveyance target object; and
a non-electric resistance changing unit to be connected to the ball screw shaft and configured to apply, to the ball screw shaft, a braking force which is a rotation resistance to the ball screw shaft and to be capable of adjusting the braking force,
wherein to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit is adjusted so a difference between a driving force of the electric motor and the external force will not be more than a sum of the weight of the conveyance target object, a weight of the moved member, and the braking force of the resistance changing unit.

19. The conveyance apparatus according to claim 18, wherein the driving force of the electric motor is further adjusted so the difference between the driving force of the electric motor and the external force will not be more than the sum of the weight of the conveyance target object, the weight of the moved member, and the braking force of the resistance changing unit.

20. A conveyance apparatus comprising:
an electric motor;
a driving shaft to be connected to the electric motor;
a rotated member to be rotated by the driving shaft;
an endless traveling body to be engaged with the rotated member;
a moved member to be connected to the endless traveling body and loaded with a conveyance target object; and
a non-electric resistance changing unit to be connected to the driving shaft and configured to apply a braking force, to the driving shaft, which is a rotation resistance to the ball screw shaft and to be capable of adjusting the braking force, wherein to stop the moved member when an external force having an excessive load which exceeds a predetermined value acts on the moved member during conveyance regardless of the presence/absence of the conveyance target object loaded on the moved member and a weight of the conveyance target object, the braking force of the resistance changing unit is adjusted so a difference between a driving force of the electric motor and the external force will not be more than a sum of the weight of the conveyance target object, a weight of the moved member, and the braking force of the resistance changing unit.

21. The conveyance apparatus according to claim 20, wherein the driving force of the electric motor is further adjusted so the difference between the driving force of the electric motor and the external force will not be more than the sum of the weight of the conveyance target object, the weight of the moved member, and the braking force of the resistance changing unit.

\* \* \* \* \*